120
United States Patent [19]

Jones

[11] 4,414,049
[45] Nov. 8, 1983

[54] METHOD OF MANUFACTURE OF AN ENERGY ABSORBING BEAM

[75] Inventor: Brian H. Jones, San Gabriel, Calif.

[73] Assignee: Kelsey-Hayes Company, Romulus, Mich.

[21] Appl. No.: 305,753

[22] Filed: Sep. 25, 1981

[51] Int. Cl.³ .............................................. B65H 81/00
[52] U.S. Cl. ................................... 156/166; 156/169; 156/245; 267/148
[58] Field of Search ................... 267/148, 149, 36 R, 267/47; 293/102, 124, 135; 156/166, 162, 169, 161, 172, 173, 175, 180, 245, 433, 425, 443, 187, 446, 189, 184; 264/257, 258, 137, 263; 428/375, 378, 113

[56] References Cited

U.S. PATENT DOCUMENTS 3,056,706 10/1962 Knoppel .............................. 156/169
3,142,598 7/1964 Rosen ................................. 267/149
3,968,958 7/1976 Huchette et al. ..................... 267/47

OTHER PUBLICATIONS

Aires, *Design of Machine Elements*, 3rd ed., pp. 189-195, The MacMillan Co., New York, 1955.
Warner et al., *Glass/Epoxy Spring is 80% Lighter Than Steel*, Plastic Design Forum, Jul./Aug., 1980, p. 14.
Trebilcock et al., *FRP Halves Spring Weight, Improves Ride*, Automotive Engneering, May 1981, pp. 31-36.

*Primary Examiner*—Michael W. Ball
*Attorney, Agent, or Firm*—Ralph J. Skinkiss; M. Michael Carpenter

[57] ABSTRACT

An energy absorbing beam is shown which may be manufactured by wrapping several side-by-side strands of resin coated filaments about an increasing number of pins mounted upon a base. The base then becomes part of a mold to which heat and pressure is applied for forming the coated filaments into a beam having a variable cross section with variable thickness. Devices for fastening the beam may be molded into the beam by passing the coated filaments about the fasteners as the filaments are wrapped about the pins.

2 Claims, 23 Drawing Figures

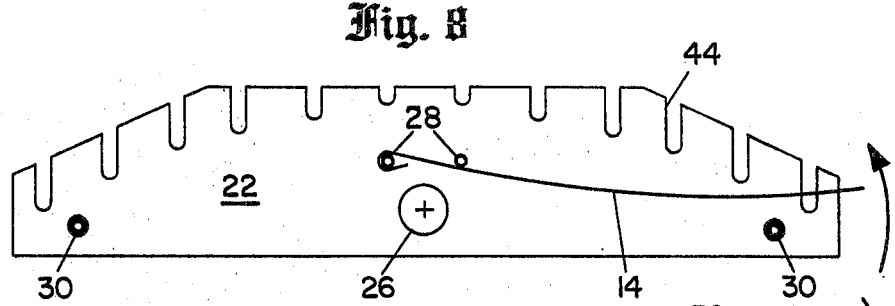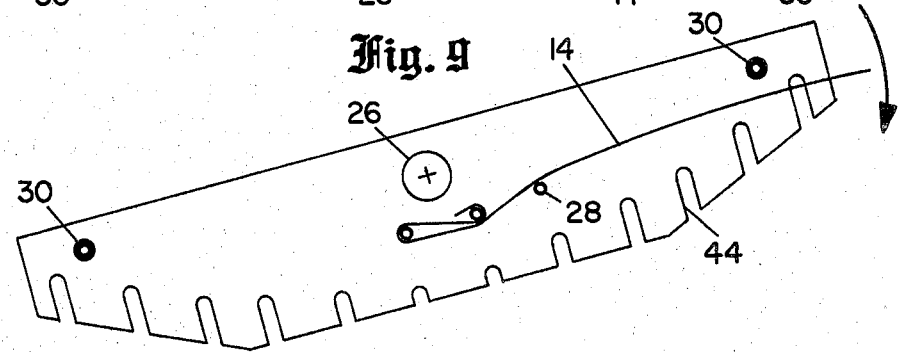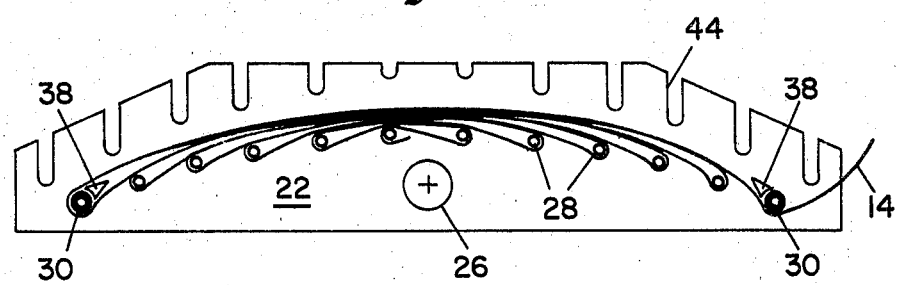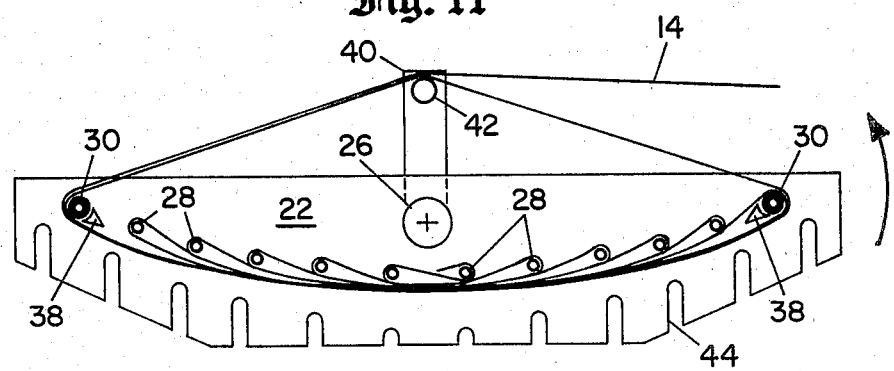

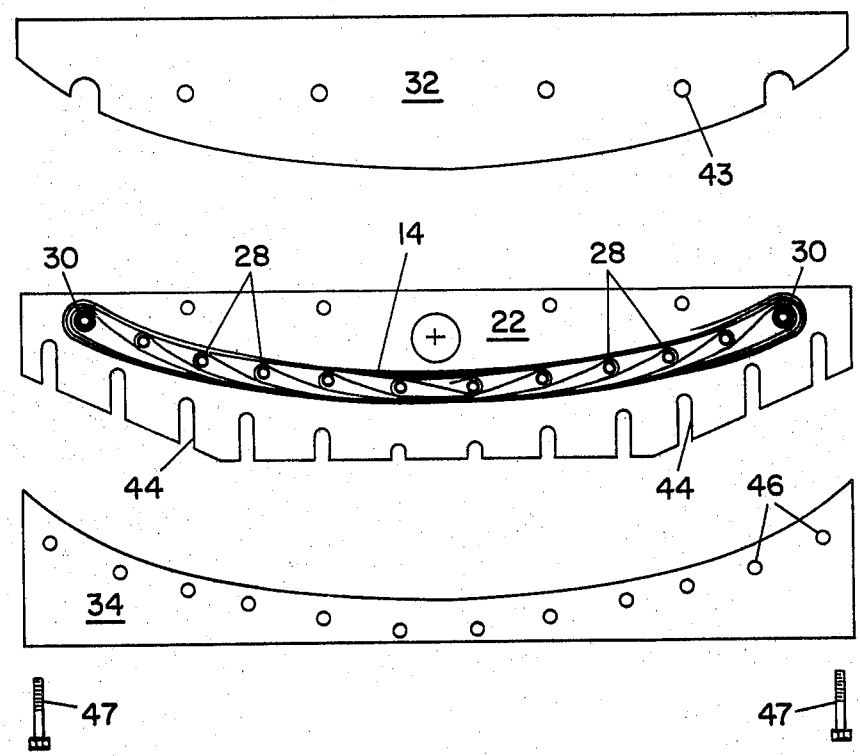

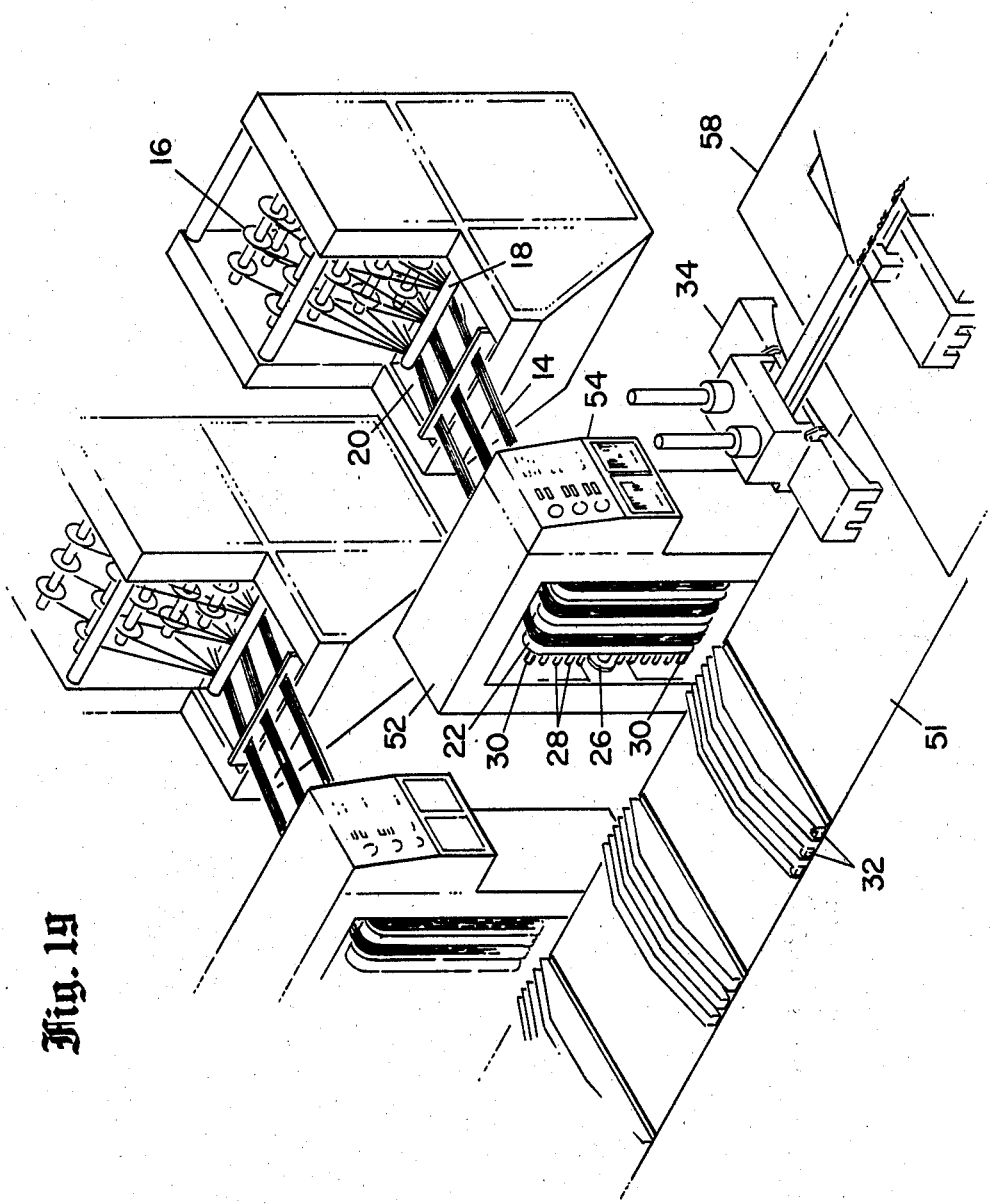

METHOD OF MANUFACTURE OF AN ENERGY ABSORBING BEAM

The present invention relates to an energy absorbing beam and, more particularly, to a beam formed from a molded, filament reinforced resin which has a variable cross-sectional area including a variable thickness.

BACKGROUND OF THE INVENTION

Energy absorbing beams, such as leaf springs, are well known in the art. The design of a multiple-leaf spring, such as used in the automobile industry, is a highly specialized art combining both theory and experiment. See Virgil Moring Aires, *Design of Machine Elements*, 3d ed., pp. 189–195, The MacMillan Co., New York, 1955.

Flat and curved springs are basically beams whose stresses and deflections can be calculated using the ordinary beam equations. These springs, however, are inefficient in their use of material because of the fact that the stress is not constant throughout the beam. A better arrangement of material, from the consideration of stress, is to design the beam with a triangular shape. That is, the width of the beam may be decreased as the beam extends from its point of support to its outermost tip, assuming the beam is a cantilevered beam; or, in place of width, the thickness may be decreased from its point of support to the outermost tip.

As it is difficult to fabricate beams having such cross-sectional variations, it is common to form the desired triangular shape by placing a plurality of flat leaf springs one on top of the other. Such a spring will have approximately the same stress as that of a triangularly configured beam. However, there are a number of considerations which contribute to inaccuracies or complexities in designing such a beam include the effect of friction between the leaves, the effect of stress concentration, the use of tapered ends on each leaf spring, and the added effect of U-bolts and clips utilized to clamp the plurality of flat or curved leaf springs into the desired shape. See Joseph E. Shigley, *Machine Design*, McGraw-Hill Series in Mechanical Engineering, 1st ed., pp. 236–238, The McGraw-Hill Co., Inc., New York, 1956.

From the consideration of steel leaf springs formed from a plurality of flat or curved steel plates, the art has advanced to the proposed utilization of glass polymeric resin springs which may be up to five times lighter than the steel leaf spring they replace. See an article by Gordon G. Warner and Ashod Torosian, "Glass/Epoxy Spring is 80% Lighter Than Steel," *Plastic Design Forum*, July/August, p. 14, 1980. In this article, various leaf springs are discussed including a leaf spring having a constant thickness with a varying triangular width and a leaf spring having a constant width with a parabolic thickness variation. Also discussed is another design approach which includes a constant area with a hyperbolic width variation. The article talks of replacing a 41 pound, 10-spring, steel beam with an 8 pound glass-epoxy spring that is designed with a constant area which, in theory, tapers to a zero thickness and infinite width. This design is nicknamed the "bow-tie" shape.

The Warner and Torosian article goes on to state that different manufacturing processes are available to obtain a maximum elastic-strain energy from material with continuous unidirectional fibers. Four processes are mentioned including: (1) pultrusion/compression molding; (2) prepreg laminate/compression molding; (3) wet-charge compression molding, and (4) filament winding. Pultrusion/compression molding is said to be capable of producing pieces having constant width and thickness which are suitable for conventional multi-leaf design. The article states that the prepreg (preimpregnated) laminate/compression molding process can produce a part with variable or constant thickness. However, preimpregnated filaments must be hand placed into a laminate layer within a mold. This manufacturing process is labor intensive and produces a discontinuous structure. The wet-charged compression molding process and the filament winding process described within the Warner and Torosian article is said to require a constant cross-sectional area. These methods thus restrict the leaf spring to either the hyperbolic-width (bow-tie) or conventional multileaf spring designs. Leaf springs manufactured by Warner and Torosian were by the filament winding process with a "bow-tie" constant area, design.

The designs discussed in the Warner and Torosian article are discussed further in an article entitled "FRP Halves Spring Weight, Improves Ride" *Automotive Engineering*, May, 1981, pp 31–36, based on SAE paper 810325, "Light Truck FRP Leaf Spring Development," by Terry N. Trebilcock and Joseph N. Epel. This article describes three types of leaf springs including a constant section spring; a constant width, tapered spring; and a constant area spring. The Trebilock and Epel article then goes on to state that constant width (variable area, variable thickness) spring poses manufacturing problems and discusses the constant area spring discussed in the Warner and Torosian article.

SUMMARY OF THE INVENTION

The processes described by the Warner and Torosian article referred to above are admittedly not capable of mass producing a filamentary reinforced plastic (FRP) beam having a variable cross-sectional area with a variable thickness. Such a process is necessary in order to create a leaf spring having a constant width with a variable thickness.

Accordingly, it is an object of the present invention to create a method and process for forming an energy absorbing beam having a variable cross-section and variable thickness.

It is another object of the present invention to provide an efficient and economic process for forming an energy absorbing beam which permits variations of the beam thickness while retaining the beam width at a constant value.

A further object of the present invention is to provide an energy absorbing beam in which the filaments are arranged generally parallel to one another for providing an optimal strength-to-weight ratio.

In accomplishing these and other objects, there is provided a method for forming an energy absorbing beam including the steps of winding a plurality of filaments into a continuous band of side-by-side filament strands. The band is then passed through a coating device where the side-by-side strands are wetted with a resin which will bind the filaments when curved. Alternately, the filaments may be preimpregnated with the desired resin. After coating, the side-by-side strands are wrapped about a pattern formed on a base by a plurality of pins whose number is increased as the side-by-side strands are wrapped about each pins. Such wrapping may be accomplished by either rotating or reciprocating the base into which the pins are inserted.

The pattern of pins in changed with continued rotation or reciprocation so that the band of side-by-side strands is wrapped in a pattern about an ever increasing amount of filament material. In this manner, the number of wraps about a first pattern is established before the pattern is changed by the addition of another set of pins. Continued wrapping will cause the band of side-by-side strands to pass over the first pattern area and wrap about the second pattern area. Additional pins creates a third pattern about which the band is wrapped. Continued addition of pins increases the pattern over which the band is wrapped until the final dimension of the energy absorbing beam has been reached. At this point, the thickness of the beam being formed is greatest in the area established by the first set of pins and least in the area established by the last set of pins. The width of the band of side-by-side strands is designed to equal the desired width of the finished beam.

If the end product is to have fastening devices, these devices may be inserted at the outer limits of the beam, for example, and the side-by-side strands may be then wrapped about the fastening device. After the wrapping has been completed, the strands are cut and folded into the desired position; the wrapped strands are then placed into a mold which is closed and exposed to heat and pressure for curing the filamentary reinforced plastic.

By utilizing the method outlined above, it is possible to mold an energy absorbing beam having a variable cross-sectional area and a variable thickness from filamentary reinforced plastic wherein the filaments are arranged generally parallel to one another along the longitudinal axis of the beam. This arrangement provides an efficient leaf spring configuration. It also provides a beam having a high strength to weight ratio.

DESCRIPTION OF THE DRAWINGS

Other objects and further advantages of the present invention will become apparent to those skilled in the art after a careful consideration of the following specification and accompanying drawings wherein:

FIGS. 8–12 illustrate in greater detail the apparatus used by the method for winding an energy absorbing beam shown in FIG. 4;

FIG. 19 illustrates a production system for winding energy absorbing beams incorporating the apparatus of FIGS. 8–12.

DESCRIPTION OF THE PREFERRED EMBODIMENTS

Figure 1:
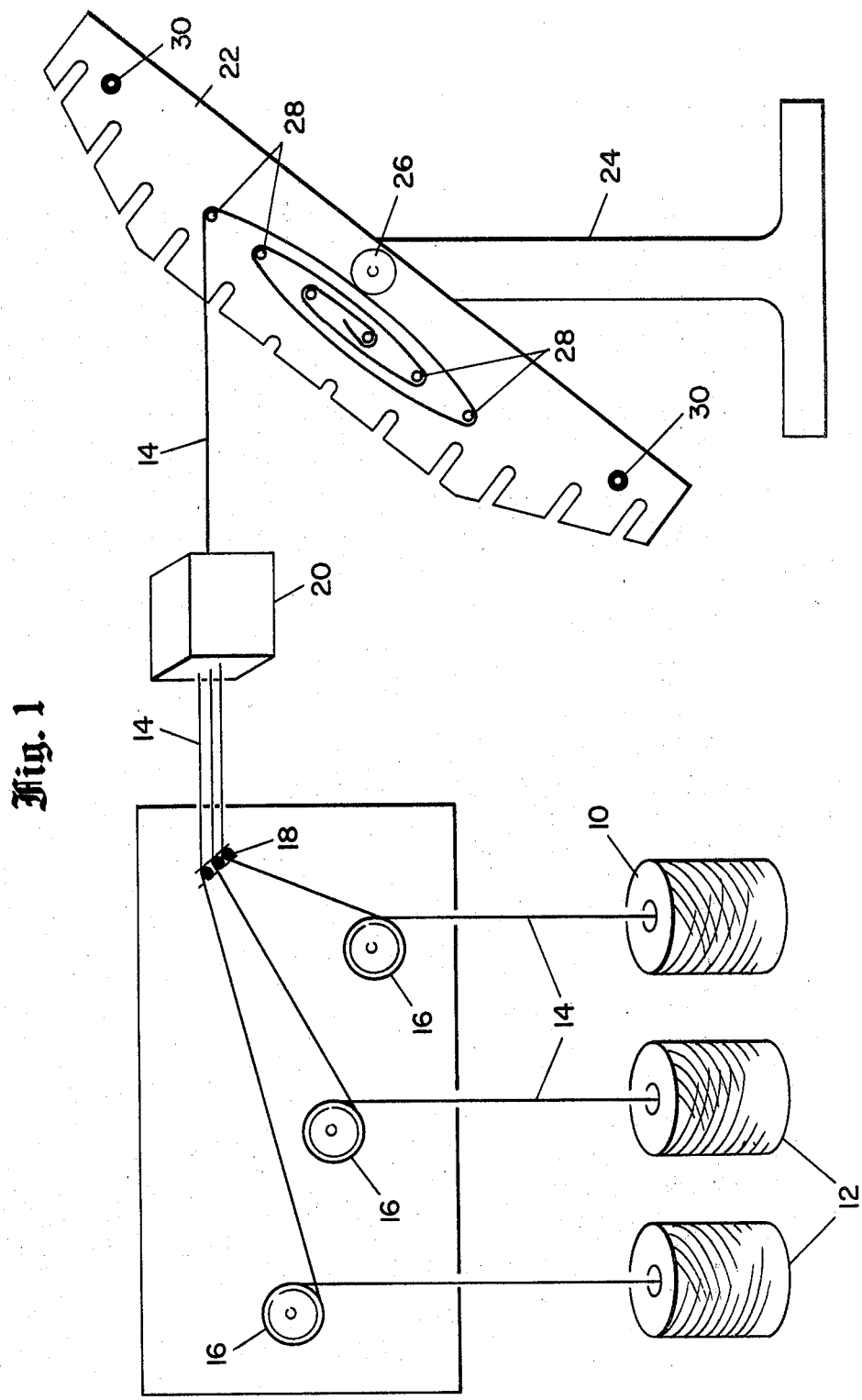
FIG. 1 is a schematic diagram showing apparatus used to wind an energy absorbing beam of the present invention.

Referring now to the drawings, a process for winding an energy absorbing beam and apparatus for carrying out that process will be discussed. The filamentary reinforced plastic (FRP) utilized in the construction of the energy absorbing beam may be formed from one of several filaments and resins. The filaments may consist of standard or high strength glass, carbon or graphite fibers, an aromatic amide structure sold under the trademark Kevlar, boron fibers, nylon fibers, quartz fibers, or asbestos fibers. In the preferred embodiment, the type of filament used is the E glass or S glass. The resins used to bind the filaments together may be of the epoxy, polyester or vinylester type. In the preferred embodiment, an epoxy resin is used.

Referring now to the drawings, FIG. 1 schematically illustrates apparatus for practicing the method of the present invention for winding an energy absorbing beam. A plurality of filaments 10, stored in spools 12, are formed into strands 14, that are removed from the plurality of spools 12. Each strand 14 passes about a tensioning wheel 16 and over a guide roller 18 prior to entering an impregnation zone formed by a wetting box 20. Alternately, the strand 14 may be preimpregnated. The guide rollers 18 direct the strands 14 into a side-by-side arrangement wherein the width of the plurality of strands equals the width of the energy absorbing beam to be fabricated. In FIG. 1, but three strands are shown. In the preferred embodiment, ten strands have been utilized. However, it is possible to utilize any number of strands. For example, a larger number of strands might be used to mold a beam whose width could then be fragmented by cutting the wide beam into a plurality of narrower beams.

Figure 2:
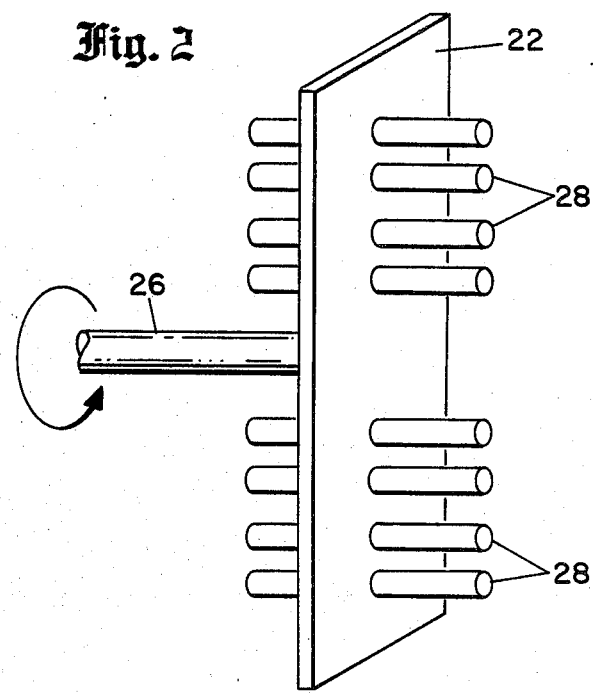
FIG. 2 is a schematic diagram illustrating one method for winding an energy absorbing beam using a plurality of side-by-side strands wound around suitably sequenced winding pins.

The impregnation zone formed by wetting box 20 contains the resin to be utilized. After the side-by-side strands 14 have been coated they pass from the impregnator 20 to a winding base 22 which is mounted upon a suitable platform 24 and driven by a motor, not shown, in a reciprocating or rotating pattern about a pivot shaft 26. In FIG. 1, the strands 14 are shown wrapped about an increasing number of pins 28. That is, as seen in FIG. 2, the first set of pins 28 are inserted into base 22 relatively close to the center of rotation formed by shaft 26. After the first rotation, the side-by-side strands 14 are wrapped about the inner most pins 28. Thereafter a second set of pins 28 are inserted into base 22 and the base is rotated to wrap a second set of side-by-side strands 14 about the pins 28. It will be seen that the wrap pattern formed by the first set of pins 28 is covered by the strands 14 as these strands are wrapped about the second set of pins. After the second set of rotation, a third set of pins are inserted and the plate 28 rotated again.

The side-by-side strands 14 of filaments 10 are now wrapped over the first, second and third patterns. It will be apparent that a cross-sectional thickness of the beam being formed will be equal to the thickness of six sets of strands 14 once these strands are placed within a mold. However, the thickness of the beam between the second and third set of pins 28 will equal but two sets of strands. The foregoing procedure continues for each rotation after which a set of pins 28 is inserted.

Figure 3:
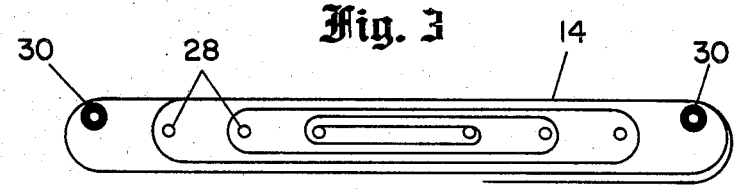
FIG. 3 illustrates the pattern followed by the side-by-side strands wound by method of FIG. 2.

The pattern of side-by-side strands 14 developed by the method shown in FIG. 2 is illustrated in FIG. 3. As further illustrated in FIG. 3, the end pins used to form the beam are not pins at all but rather fastening devices, such as bushings 30. These bushings or eyelets are provided to fasten the energy absorbing beam into a desired location. For example, if the fabricated beam is a leaf spring, the eyelets may be used to attach the ends of the spring into a suspension system of a automobile. As seen in FIG. 1, the bushings 30 are mounted upon the base 22 after the insertion of the last pin 28 and after the last wrap of the side-by-side strands 14 about that last pin. The base may then be rotated again to wrap the continuous strands 14 about the bushings 30. In practice, several wraps may be desired to build up a reasonable amount of filamentary reinforced plastic about each bushing 30.

The base plate 22 is shown as a single plate in FIGS. 1 and 2. However, in the preferred embodiment, two plates are utilized whose spacing equals the width of the plurality of strands 14 and width of the energy absorbing beam desired. After the last wrap has been placed about the pins 28 and bushings 30, the continuous wrap is terminated by cutting strands 14 and securing them to the multiple wraps. At this point, the mold is closed by placing a mold base 32 (FIG. 12) and mold cover 34 on each side of the continuous wrapped strands 14. It will now be seen that the two base plates 22 which make up the rotating base also form the side walls of the mold. The pins 28 are then removed from the base plate 22 and the mold subjected to heat and pressure for curving the filamentary reinforced plastic to be described in greater detail hereinbelow.

After the heat and pressure steps have been completed, the mold 22, 32, 34 is opened and a beam 36 removed therefrom. After the flash has been removed from the molded beam, it is ready to use. The leaf spring 36 shown in FIG. 4(a) may replace a steel, multi-leaf spring used in automobiles, as mentioned above.

The bushings 30 have been molded into the beam 36 and become an integral part thereof. Through the unique wrapping arrangement of FIG. 2, the multiple turns of strands 14 about bushings 30 securely fasten these bushings into the beam. The continuous strands of roving 14 which were formed into a side-by-side band with each filament generally parallel to the other remained parallel as they were wrapped about pins 28. This parallel arrangement is retained during molding with the end product, beam 36, formed from a plurality of parallel fibers 10 within each strand 14 which are now bonded by the cured resin wetted upon the strands by impregnator 20.

Figure 4A:
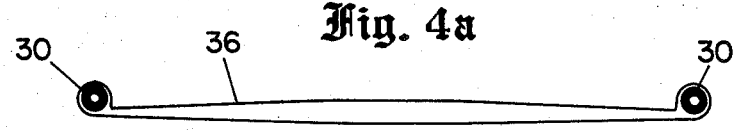
FIGS. 4(a) and (b) illustrates an energy absorbing beam wound by the method of FIG. 2 and pattern of FIG. 3 with and without fastening devices, respectively.
Figure 4B:
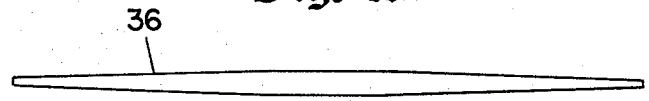

It will be seen from FIGS. 4(a) and (b) that the method of rotation shown in FIG. 2 produces a beam or leaf spring whose cross-sectional area and thickness varies. Beam 36 is thickest at its midpoint and tapers to its narrowest thickness at each end. While the beam shown in FIG. 4(a) includes bushings 30, it is not necessary to insert these bushings. Thus, the beam shown in FIG. 4(b) might be used as a leaf spring or some other energy absorbing beam element, such as the structural support for a ski.

Figure 5:
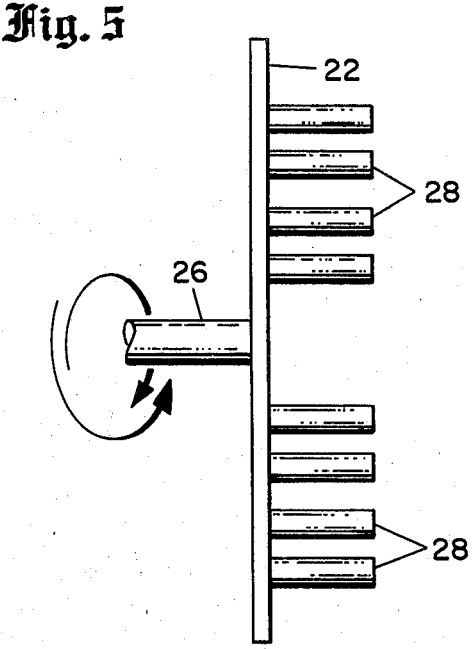
FIG. 5 illustrates another method used to wind an energy absorbing beam similar to FIG. 2.

As seen in FIG. 5, the apparatus of FIG. 1 may be utilized to produce a second wrapping pattern. That is, the pins 28 may be inserted one at a time while the base 22 is reciprocated rather than rotated about shaft 26. Whereas the method described in FIGS. 2 and 3 lends itself to the formation of a beam 36 whose longitudinal axis is a straight line, it will be seen that the method of FIGS. 5 and 6 lends itself to the fabrication of a beam 36 whose longitudinal axis is a curve.

Figure 7A:
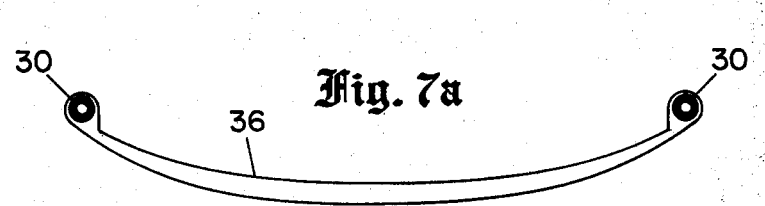
FIGS. 7 (a) and (b) illustrate an energy absorbing beam wound by the method of FIG. 5 and pattern of FIG. 6 with and without fastening devices, respectively.

As seen in FIG. 8, the process for manufacturing the beam 36 shown in FIGS. 7(a) or (b) is started by wrapping the side-by-side strands 14 about a first pin 28. The plate 22 is then reciprocated in a counterclockwise direction until a second pin 28 may be inserted above the strands 14. The plate 22 is then reciprocated in a clockwise direction until the third pin 28 may be inserted below the strands 14, FIG. 9.

In a preferred embodiment, ten continuous strands were drawn side-by-side through the impregnator 20 where each was wetted with a suitable resin. The reader should remember that any number of strands may be used and that such strands may be preimpregnated with resin. Each strand 14 was made from a plurality of filaments; typically, two hundred and eight filaments form and end and twenty ends form a strand. The desired width of the leaf spring being fabricated was equal to the width of the ten strands. This width was also the spacing used between the two base plates 22 which formed the base into which pins 28 are to be inserted. As a reciprocal wrapping motion is used, it is possible to use the fastener bushings 30 as a spacer between plates 22. A shoulder on shaft 26 forms the third point to establish a reliable spacing between plates 22.

Figure 6:
FIG. 6 is similar to FIG. 3 but shows the pattern followed by side-by-side strands when winding a beam when using the method illustrated in FIG. 5.

After the plates 22 are reciprocated several times and all pins 28 inserted, a wrap pattern similar to that shown in FIG. 6 or 10 is created. As shown in FIG. 10, as the bushing 30 is wrapped for the first time by strands 14, a wedge shaped filler 38 may be inserted. The filler 38 has a length equal to the width of beam 36 with a generally triangular cross-section having one surface arched to match the curvature of the bushing 30. Alternately, the insert 38 may be formed as the part of the bushing 30, as by extrusion.

As seen in FIG. 10, ten pins 28, for example, are inserted into plate 22. If the strands 14 are wrapped once about each pin, it will be noted that the thickness of the wrapped strands 14 will include twenty strands at the thickest point while but a thickness of two strands will be found at the thinnest point. Thereafter, a wrap is placed once around the bushings 30 to increase the number of strands to twenty-two at the thickest point of the beam and four at the thinnest point. In the preferred embodiments, twenty-eight pins were used to reciprocally wrap fifty-six strands about the thickest portion of the beam. Thereafter, the bushings 30 which had been previously covered with a protective cover were exposed and coated with a polyester resin to increase bonding to strands 14. A spacer plate 40 was then attached to the shaft 26.

Plate 40 mounts a post 42 which acts as a final pin. The spacing of the post 42 fron the pins 28 is carefully calculated so that the length of the side-by-side strands 14 wrapped about post 42 between the two bushings 30 will exactly equal the length of strand required to traverse the space between the bushings 30 along the upper surface of the strands 14 wrapped about pins 28, FIG. 11. In the preferred embodiment, ten full rotations of plate 22 wrapped ten turns of strands 14 about the pins 28 and post 42. After the desired number of turns is completed, it may be desired to lay-up individual bands of side-by-side strands 14 cut at a predetermined length. These strands may be layed along the upper surface of the strands wrapped about pins 28. The post 42 was then removed to permit the ten turns of strands wrapped about it to be lowered down against the upper surfaces of the strands wrapped about pins 28. At this point, the shaft 26 is also removed from between the two plates 22.

As illustrated in FIG. 12, a mold base 32 is then lowered upon the side-by-side strands 14 between bases 22 and fastened into position by fasteners, such as bolts, not shown, which pass through holes 43. The mold is then turned over and the cover 34 lowered into position between base plates 22. The plates 22 are provided with slots 44 through which fasteners, not shown, may pass to engage apertures 46 in mold cover 34. Once the mold cover 34 is secured into position, the mold base 32 may then be fastened against cover 34 by fasteners, such as bolts 47. The final alignment of the mold is accomplished by driving tapered pins through apertures, now shown, in the surface of plates 22 into the mold base 32. These tapered pins force the alignment of mold base 32 and plates 22. Similarly, the alignment of the mold cover 34 follows the alignment base 32 as the slots 44 permit the cover 34 to align itself with the alignment of base 32.

Once assembled, the pins 28 are removed from plates 22 and the assembled mold is then exposed to heat. In one embodiment, electrical heating elements may be inserted into apertures, not shown, in plate 22 and mold base 32 for heating the resin to its curing temperature. During the heat cycle, the mold is placed in a press and exposed to pressure to prevent creep or expansion of the mold.

Figure 7B:
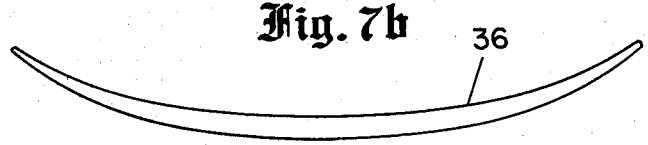

The leaf spring 36 removed from the mold formed by base plates 22, mold base 32 and mold cover 34 is shown in FIG. 7(a). This leaf spring has a thickness of seventy six strands at its thickest point and but twenty strands at its thinnest point between the bushing 30 and the last, outermost pins 28. While the preferred embodiment has been described as having a given number of turns and a specified configuration, it will be apparent to those skilled in the art that any number of turns may be utilized. Further, the leaf spring constructed by the process of the present invention may or may not incorporate a fastening device such as bushing 30. Such springs may be used for many devices beyond a leaf spring for an automobile. For example, a curved leaf spring 36 as shown in FIG. 7(b) could be utilized as the structural element of an archer's bow.

Figure 13:
FIG. 13 illustrates another pattern for winding side-by-side strands of filaments similar to FIGS. 3 and 6.
Figure 14A:
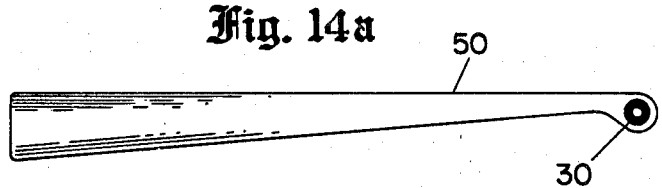
FIGS. 14(a) and (b) illustrate energy absorbing beams formed by the pattern of FIG. 13.

Referring to FIG. 13, it will be seen that pins 28 may be arranged in a different pattern to receive the wrap of side-by-side strands 14. In the pattern of FIG. 13, the pins are expanded in but one direction. As the strands 14 are wrapped about the pins 28, they form a beam 50 whose thickness is greatest at one end tapering to its thinnest point at the other end. As shown in FIGS. 14(a) and (b), the beam 50 which may be used as a cantilevered leaf spring may or may not include a fastening device such as a bushing 30.

Figure 14B:
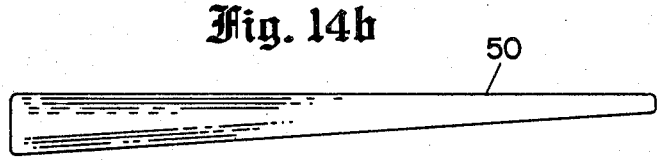
Figure 15:
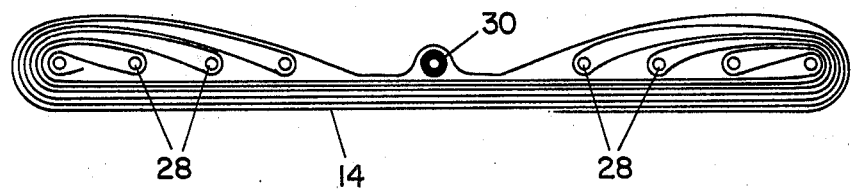
FIG. 15 illustrates yet another pattern for winding strands of filaments similar to FIGS. 3, 6 and 13.
Figure 16A:
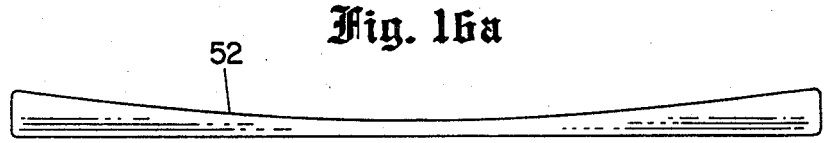
FIGS. 16(a) and (b) illustrate energy absorbing beams wound by the pattern of FIG. 15.
Figure 16B:
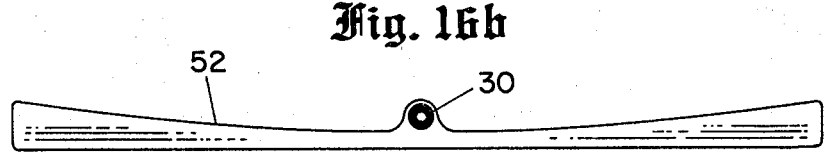

If it is desired to create a beam whose center portion is thinner than its outer extremes, the winding pattern shown in FIG. 15 may be utilized. Here, the pins 28 are initially inserted into the base 22 at an extreme dimension. Thereafter, the plate 22 is reciprocated and pins 28 are inserted in an ever closer pattern. If the beam is a straight beam, such as beam 52 shown in FIGS. 16(a) and (b), it may be that the side-by-side strands 14 would contact the previously wrapped strands before passing beyond the aperture through which the next pin pin 28 could be inserted. This contact could cause misalignment of the side-by-side strands 14. In order to avoid this, it is possible to arrange the pins 28 in an arcuate path. After the pins are wrapped and placed into the mold base 32, pins 28 may be removed and the strands 14 may be manipulated to fit within the mold pattern desired. After the pin have been wrapped, a bushing 30 may be inserted in the middle of the beam. However, because it is not possible to wrap the bushing 30, the strength of beam 52 is not as great about the bushing 30 as in the beam shown in FIGS. 4, 7 and 14. To attach the beam, a U-bolt might be used or the bushing 30 might be used simply as a means of locating a clamping device which could be wrapped about the beam 52.

In another variation of the preferred embodiment, it is envisioned that several bands of side-by-side strands 14 could be wrapped at the same time. For example, it is possible to mold a leaf spring whose width if four times greater than the desired width. After the mold is subjected to heat and pressure to cure its contents, the resultant beam may then be cut into four beams of the desired size.

In place of side-by-side strands 14, a resin coated cloth, wet or web might be used having a widht equal to the width of the beam desired. For increased torsional strength, the wefts of such cloth, mat or web could be arranged at ±45° to the generally parallel filaments thereof. For a smooth finish over the beam, a final covering of fine filaments in the form of a tube could be used.

Referring now to FIG. 19 a production system for the leaf springs described in FIGS. 8 through 12 is shown. A conveyor 51 carries the mold base 32 to the desired position opposite a winding station 52 which is controlled by suitable control means 54. Plates 22 are mounted upon a shaft 26 for reciprocal motion within the station 52. At the desired orientation of plates 22, pins 28 are automatically inserted between three sets of such plates for wrapping three beams simultaneously. After the bushings 30 have been wrapped, the three uncured beams and bases 22 are placed into molds 32. The molds 32 are then transported by the conveyor belt 51 to a second where the mold covers 34 are lowered over the bases 32. Thereafter, the assembled mold is passed through a tunnel oven 58 where it is subjected to heat and pressure via a press, not shown.

From the foregoing, it will be understood that the method described may be varied to produce several configurations of an energy absorbing beam. The beam may have its thickest cross-section at its mid-point tapering to its ends or it may have its thickest section at one end tapering to the other end. Alternately, the beam may be configured with its thinnest cross-section at the mid-point tapering toward thicker ends. Regardless of the configuration of the tapering beam, it is possible to fabricate the beam with or without fastening means. The processes for fabricating the beam desired may vary from a rotating pattern to a reciprocating pattern to a combination of both.

Figure 17:
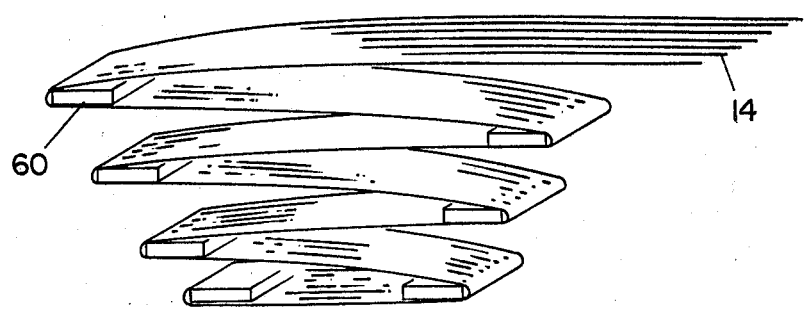
FIG. 17 illustrates still another pattern for winding strands of the filaments similar to FIGS. 3, 6, 13 and 15.
Figure 18:
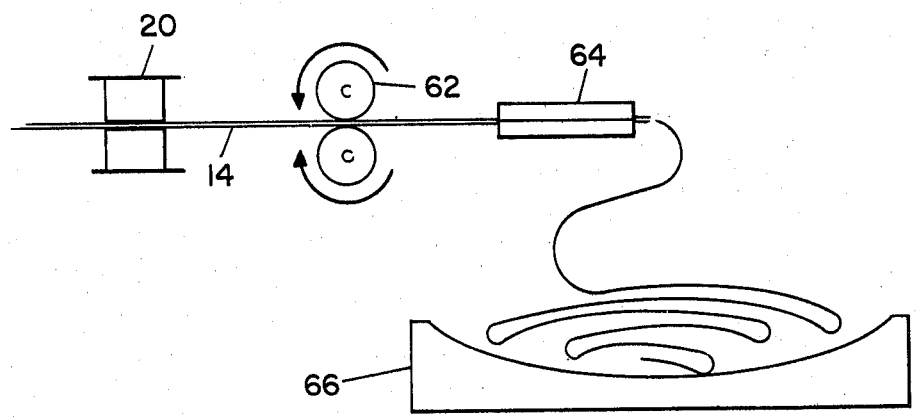
FIG. 18 illustrates another apparatus for winding strands of filaments similar to FIGS. 2 and 5.

Another means for producing a variable thickness leaf spring is shown in FIG. 17. This technique replaces the sequencing pins with bars that are moved relative to one another in such a way as to create the required thickness variation. The strands 14 may be wrapped about tensioning bars 60 which may be movable in order to allow easy wrapping. The bars are then spread and removed prior to placing the strands in a mold. A further approach for creating a beam having a variable thickness is shown in FIG. 18 wherein the strands 14 are driven by pinch rollers 62 through an extrusion head 64 which is reciprocated back and forth over a mold base 66. The reciprocal motion of the head 64 permits the strands 14 to be folded back and forth into mold 66 in an ever increasing fold length pattern. While other variations are possible, the present invention should be limited only by appended claims.

I claim:

1. In a method of forming a resin impregnated preform for the manufacture of a composite energy absorbing beam the steps of:
   (a) providing a fixture positioning first and second end bushings, said fixture including a plurality of pin means extending between said first and second end bushings defining a predetermined curve therebetween;
   (b) selecting one of said pin means as an anchor pin;
   (c) sequentially winding a tow of continuous resin impregnated fibers in a pattern about said pins commencing with said anchor pin and extending to a first next adjacent pin thereto wrapping said tow about said first next adjacent pin thereby reversing direction of said tow toward said anchor pin, winding said tow past and radially outward of said anchor pin to a second next adjacent pin wrapping said tow about said second next adjacent pin thereby reversing direction of said tow toward said anchor pin, winding said tow past and radially outward of said anchor pin and said first adjacent pin advancing to the next positioned pin wrapping said tow thereabout reversing direction of said tow toward said anchor pin, winding said tow past and radially outward of the prior wrapped pins to the next progressively positioned pin wrapping said tow thereabout reversing direction of said tow toward said anchor pin, continuing the winding pattern until all pins and the end bushings are wrapped by said tow.

2. A method of forming an energy absorbing beam comprising the steps of
   (a) providing a fixture positioning first and second end fittings, said fixture including a plurality of pin means extending between said end fittings defining a peripheral curve circumscribing said pins and end fittings;
   (b) sequentially winding a tow of resin impregnated fibers in a sinuous pattern about said pins commencing with a centrally positioned anchor pin, then extending to an adjacent pin passing radially inside of the pin and wrapping said tow about the pin thereby reversing direction of said tow towards said anchor pin, then winding said tow along said peripheral curve to the next unwrapped pin passing radially inside of the pin and wrapping said tow about the pin thereby reversing direction of the tow toward said anchor pin, then winding said tow along said peripheral curve to the next adjacent unwrapped pin passing radially inside of the pin and wrapping said tow about the pin thereby reversing the direction of said tow toward said anchor pin, continuing said pattern until all pins and the end bushings have been wrapped with said tow;
   (c) circumferentially wrapping said tow alternately around said end fittings thereby enclosing the prior wound fiber plies within the circumscribing fibers;
   (d) placing the resulting plies of impregnated fibers in a mold and curing said resin.

* * * * *